United States Patent [19]

Szabo et al.

[11] 3,852,661
[45] Dec. 3, 1974

[54] A POSITION INDICATOR EMPLOYING MAGNETIC CIRCUITS TO MONITOR THE POSITION OF A MAGNETICALLY PERMEABLE MEMBER MOVABLE ALONG AN AXIS HAVING ONE DEGREE OF FREEDOM

[75] Inventors: Andras I. Szabo, Export; Dan V. Tarli, Wilmerding, both of Pa.

[73] Assignee: Westinghouse Electric Corporation, Pittsburgh, Pa.

[22] Filed: Sept. 25, 1972

[21] Appl. No.: 292,245

Related U.S. Application Data

[63] Continuation of Ser. No. 110,058, Jan. 27, 1971, abandoned.

[52] U.S. Cl. ............ 324/34 PS, 73/314, 176/19 R, 336/45, 336/233, 340/195, 340/282
[51] Int. Cl. ............................................ G01r 33/00
[58] Field of Search ............ 324/34 R, 34 PS, 34 D, 324/41; 340/195–197, 282, 21; 335/206; 336/45, 110, 233; 73/313, 314, DIG. 5; 176/19 R

[56] References Cited
UNITED STATES PATENTS

| | | | |
|---|---|---|---|
| 2,026,299 | 12/1935 | Boyd | 324/34 R |
| 2,901,676 | 8/1959 | Mittag | 324/34 PS |
| 3,032,754 | 5/1962 | Pietro | 340/282 |

FOREIGN PATENTS OR APPLICATIONS

| | | | |
|---|---|---|---|
| 909,848 | 11/1962 | Great Britain | 176/19 J |
| 896,256 | 5/1962 | Great Britain | 340/282 |
| 283,256 | 1/1928 | Great Britain | 324/37 |

OTHER PUBLICATIONS

Darling, R. H. High Reliability Position Sensor, IBM Tech. Bull., Vol. 12, No. 4, Sept. 1969, pp. 536

*Primary Examiner*—Robert J. Corcoran
*Attorney, Agent, or Firm*—D. C. Abeles; A. T. Stratton

[57] ABSTRACT

A new position indicator is disclosed herein for sensing the position of a magnetized hard magnetic member. The indicator comprises a soft magnetic core having an open and a closed magnetic loop with a magnetic flux path common to both loops. The open loop has two poles associated therewith. A magnetized movable hard magnetic member is provided which is movable along an axis proximate and substantially parallel to the axis formed by the poles of the magnetic core so that movement of the magnetic member along the axis of movement thereof substantially closes the magnetic core flux path associated with the open loop at at least one point in travel thereof so as to induce a relative change in flux within the magnetic core. Detection means are provided for detecting this relative change in flux and thereby indicating the presence of said movable magnetic member substantially between the poles of the magnetic core.

14 Claims, 7 Drawing Figures

PATENTED DEC 3 1974
3,852,661
SHEET 1 OF 2

WITNESSES

INVENTORS
Andras I. Szabo
and Dan V. Tarli
BY
ATTORNEY

A POSITION INDICATOR EMPLOYING MAGNETIC CIRCUITS TO MONITOR THE POSITION OF A MAGNETICALLY PERMEABLE MEMBER MOVABLE ALONG AN AXIS HAVING ONE DEGREE OF FREEDOM

CROSS-REFERENCE TO RELATED APPLICATIONS

The present invention is a continuation of application Ser. No. 110,058, filed Jan. 27, 1971, now abandoned and is related to the invention covered by U.S. Pat. No. 3,742,409, entitled "A Magnetic Position Indicator" by Andre Wavre, Andras I. Szabo and Dean Santis and assigned to the assignee of the present invention.

BACKGROUND OF THE INVENTION

This invention pertains in general to a new position indicator for detecting the presence of a magnetized hard magnetic member and more particularly to a position indicator that determines the relative position of control rods within the core of a nuclear reactor.

One type of control rod drive mechanism for nuclear reactors is an electrically controlled, hydraulically operated device which individually moves control rods between two rest positions; either full in or full out. Each control rod consists of at least one neutron absorber element, approximately the same size as the fuel rods. Each control rod is connected to a hydraulic mechanism and travels in guide thimbles provided within the fuel assembly. In the inserted position, the absorber elements fit into corresponding fuel assembly thimbles and in the withdrawn position they move into guide tubes. This is the same arrangement used in the current pressurized water reactor designs, except that in the aforedescribed system the rods cannot assume any intermediate positions other than being either fully inserted or fully withdrawn, while in present designs the rods can assume intermediate positions within the reactor core. Each hydraulic control rod mechanism is a completely independent system which controls the movement of one drive rod and its associated absorber rods. In this example, two interconnected absorber rods form one control rod. For a better understanding of the operation of the aforedescribed control system, reference can be had to U.S. Pat. No. 3,519,535, issued July 7, 1970, by Robert J. French et al., entitled "Nuclear Fuel Assembly with Plural Independent Control Elements and System Therefor" and assigned to the Westinghouse Electric Corporation.

Several types of indicators have been considered for application in such control systems to monitor the relative position of the control rods within the nuclear core. The first indicator considered was a transformer type rod position indicator. This indicator consisted of a transformer wound on a C-core with an auxiliary coil in series with a secondary winding. The poles of the C-core pass through the control rod housing and are welded to the housing. The magnetic circuit is opened or closed by the absence or presence of the magnetic drive rod which is used as part of the magnetic circuit. When the drive rod is present and the magnetic circuit is closed, the secondary voltage is large due to transformer action. When the rod is missing, the secondary voltage is small because of the reluctance of the magnetic circuit and the affects of an coil provided to null out the secondary voltage. This scheme has two basic disadvantages, due to the shorting affect of the non-magnetic metallic drive rod housing on the transformer, which lead to its unreliable and ineffective use. First, it must be excited by a low frequency sinusoidal signal, for example, 10 hertz, which requires some sort of frequency converter as a source; and second, due to the shorting affect, the reliability of obtaining good output signal magnitudes is directly affected by the effective resistance of the shorted turn which, as is well known, is not temperature stable.

Another type of rod position indicator that was for such an application is a variable magnetic coupling type rod position indicator. In this type of system an array of coils is placed over the control rod travel housing. Alternate coils are connected in series to form a primary and a secondary winding. The primary is supplied with an AC source. Since the drive rod is made from a magnetic stainless steel and the rod travel housing is made from a non-magnetic stainless steel, the inductive coupling between the two windings, and hence, the voltage appearing across the secondary winding is a function of the insertion of the drive rod.

The most serious shortcoming of the variable magnetic coupling type of rod position indicator is its sensitivity to temperature variations. The magnetic properties of the drive rod, and hence the coupling between the windings, is highly temperature dependent. The fact that the rod travel housing is made from a high conductivity metal, further limits the performance of the system. The rod travel housing acts as a short-circuited single turn winding. Most of the power supplied to the primary winding is dissipated in the form of eddy currents circulating within the wall of the rod travel housing. Furthermore, the variable magnetic coupling type array requires the use of expensive high temperature insulating materials to prevent coil burn-up.

Thus, a new rod position indicator was necessary to overcome the disadvantages of those already considered. For optimum performance, the desired rod indicator must exhibit the following characteristics: it must be reliable; it must be temperature stable; it must be inexpensive; it must not destroy the sealed integrity of the mechanism housing; it must give output signals which are large in magnitude in order to eliminate amplification and noise problems; it must have good resolution and accuracy so that it can indicate the correct position of the drive rod; it must not slow down the scram time of the control rod; it must require a minimum amount of installation wiring; and it must be efficient to use.

SUMMARY OF THE INVENTION

In accordance with this invention a new position indicator was devised to overcome the disadvantages of the prior art to provide the aforementioned desired characteristics. This position indication system utilizes a plurality of bistable position indicators per drive rod or movable element to determine its relative position. The indicators are positioned in tandem along the drive rod housing and indicate the presence or absence of the drive rod at the respective locations of the indicators.

The operation of each of the rod position indicators is based upon the magnetic flip-flop characteristic of the narrow hysteresis loops of soft magnetic materials. Each position indicator sensor basically comprises a soft magnetic core having an open and a closed magnetic loop with a magnetic flux path common to both loops. The open loop has two poles associated therewith. The poles of the magnetic core are placed longitudinally along the drive rod housing so that movement of the magnetized hard magnetic drive rod substantially across the poles of the magnetic core causes a reversal in the direction of the magnetic flux flowing through the soft magnetic core. This change in flux within the magnetic core caused by the magnetic drive rod can be detected, thereby indicating the presence of the drive rod within proximity of the poles of the magnetic core. The flux reversal produced in the sensing element by this magnetic flip-flop action can be converted to an electrical signal either by using magnetically biased reed switches or saturable transformers, which can be made part of the sensing element. The saturable transformer version is preferred because it gives excellent reliability and smaller hysteresis in position indication.

The saturable transformer type of detector is magnetically coupled to the soft magnetic core so that it is under the influence of the closed loop of the flux flowing through the core. The primary winding of the saturable transformer is excited by an AC current, preferably supplied by a current source and the position signal is taken from the secondary winding. The amplitude of the secondary voltage is significantly reduced when the transformer laminations are saturated under the influence of the steady flux supplied by the magnetic rod, the position of which is sensed.

Flux rings or other suitable pole pieces can be attached to the soft magnetic core in order to assist the passage of the steady flux from the magnetic rod through the saturable laminations of the core.

The versatility of the disclosed sensing element can be greatly increased by incorporating a magnetic biasing scheme. The magnetic biasing is produced by a permanent magnet which induces a steady flux through the transformer lamination. The permanent magnet can be replaced with an electromagnet or a DC winding if desired. There are five modes of operation depending upon the magnetic biasing used: no biasing applied; weak biasing with aiding polarization; weak biasing with opposing polarization; strong biasing with aiding polarization; and strong biasing with opposing polarization. The polarization described is that induced at the poles of the core relative to the polarization of the permanently magnetized rod. Each of the modes thus listed, gives a rod position indication. It is largely a matter of convenience which of the five modes is used in a given application. The last mode is preferred in the case of a rod position indication system intended for nuclear reactor application, because it requires simpler circuitry in the remainder of the system. The strength of the magnet in the last mode is desirably selected to saturate the transformer in the absence of the magnetic rod, and its polarity is chosen opposite to that of the magnetic rod, so that the presence of the magnetic rod substantially between the poles of the sensing element reduces the amount of flux flowing in the saturable transformer taking it out of saturation. Accordingly, the magnetized rod is required to provide a sufficient source of flux to remove the transformer from saturation when positioned between the poles of the sensing element. The output of the secondary winding of the saturable transformer will thereby increase indicating the presence of the rod in that location.

The individual sensing elements can be arranged in tandem or interleaved along the drive rod housing to indicate incremental movement of the rod therein. If the rod which moves within the housing is not a permanent magnet, a DC coil can be threaded over it and placed at the bottom of the array. Such a coil when supplied with an adequate DC current will magnetize the rod, and the rod position indicator will function correctly. In the case of drive rods driven by magnetic jack mechanisms, such as the mechanism described in U.S. Pat. No. 3,158,766, issued Nov. 24, 1964 by E. Frisch, entitled "Gripper Type Linear Motion Device," no DC exciting coil is needed because the DC coils of the jack mechanism magnetize the rod.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
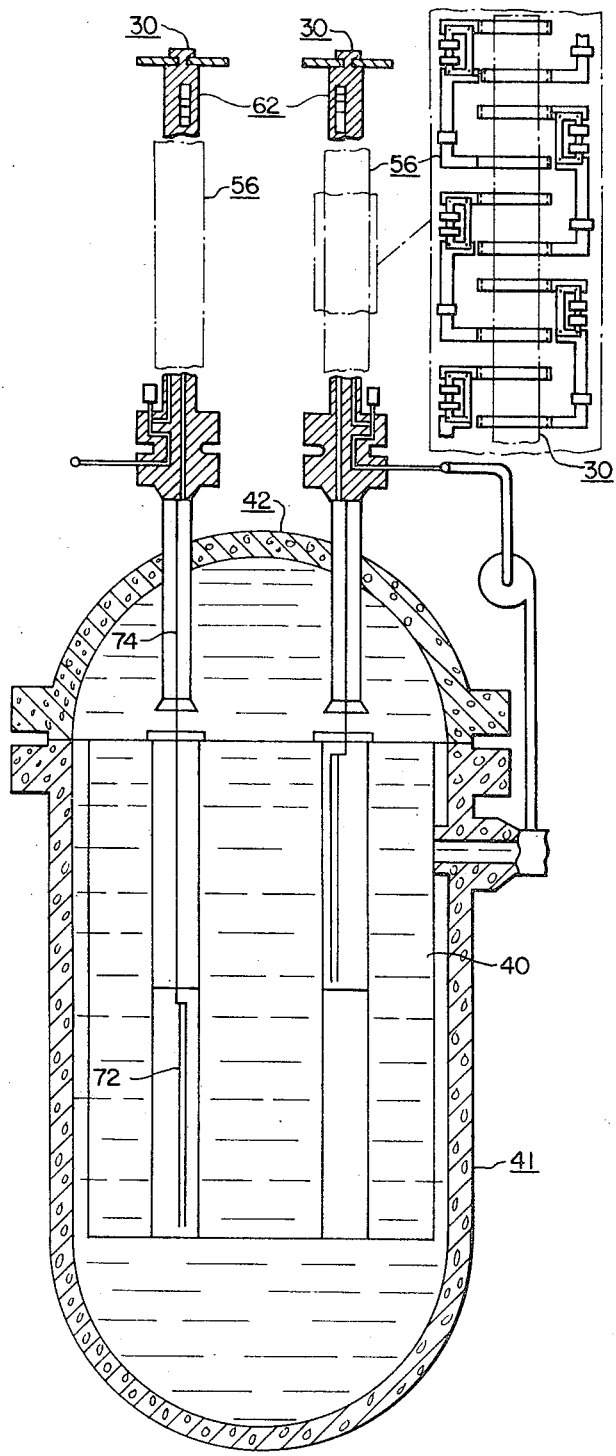
FIG. 1 is a schematic diagram of a nuclear reactor and its control rod drive system embodying the novel position indicator of this invention.

Accurate knowledge of the position of control rods within a nuclear reactor is essential for ensuring the reactor's safe and efficient operation. As may be appreciated by referring to FIG. 1 the sensing of position of the control rods within a pressurized water reactor is particularly difficult because of the necessity for maintaining the sealed integrity of the reactor pressure vessel 41. The control rods 72 and the drive rods 74 which are structurally coupled to their respective control rods 72 are surrounded with water 40 which completely fills the pressure vessel 41. Under normal operating conditions, the water is at a high temperature and pressurized so that no boiling takes place.

The position of the control rods 72 must be determined from measurements of the state of sensing elements placed outside the pressure vessel 41, because no mechanical penetration of the pressure vessel 41 for the purposes of control rod position sensing is permitted. The only area where such sensing elements can be placed is along the rod travel housing 62. The drive rods 74 move within their respective rod travel housing 62, formed in the shape of a sealed pipe longitudinally extending upward from the head 42 of the reactor.

Sensing elements 56 placed along the rod travel housing 62 can sense the position of the drive rod 74 only. However, it is normally assumed that the fastening of the control rods 72 to the drive rods 74 is reliable and therefore the displacement of the drive rod 74 and the control rod 72 are the same. For a more detailed understanding of the reactor control rod system, reference may be had to application Ser. No. 304,292, which is a continuation of application Ser. No. 721,122, filed Apr. 12, 1968 by Robert J. Creagan et al., entitled "Fuel Assembly For Nuclear Reactors," and assigned to the Westinghouse Electric Corporation.

A new rod position indication system has been developed for detecting the presence or absence of the control rod at the indicator locations. The new indication system sensor, disclosed herein, is particularly suitable for applications wherein drive rods are constructed from a magnetic material and the rod travel housing from a non-magnetic material. The sensor can utilize both alternating and steady flux passing through the drive rod and the wall of the rod travel housing. The use of a steady flux is preferred because it produces no eddy currents and leads to simpler circuit arrangements and better performance.

Figure 2A:
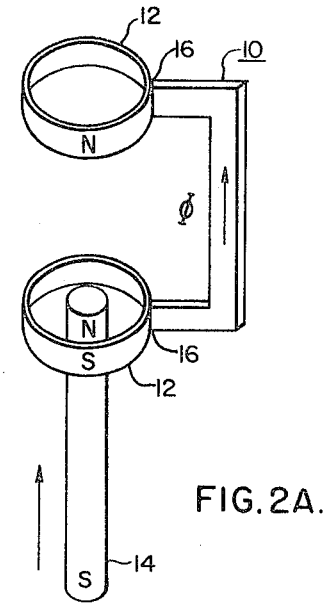
FIGS. 2A and 2B show perspective views of a simplified embodiment illustrating the basic operating principle involved when the rod is respectively absent and present.
Figure 2B:
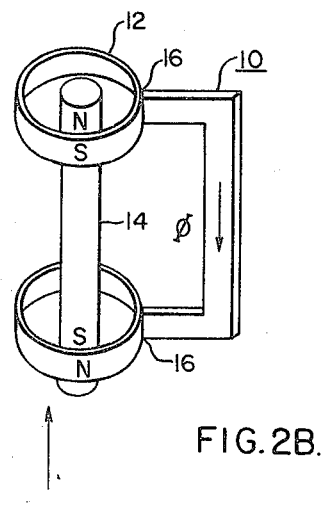

The operation of the disclosed rod position sensor can be better understood by reference to FIGS. 2A and 2B which illustrate the magnetic flip-flop action characteristic of the narrow hysteresis loops of soft magnetic materials. Soft magnetic or magnetically soft materials, as referred herein, are ferromagnetic materials that become magnetized readily upon the application of a flux field and that return to practically a non-magnetic condition when the field is removed. This may be contrasted with hard magnetic, or magnetically hard materials, which are ferromagnetic materials which are capable of being magnetized permanently because of their ability to retain induced magnetization and magnetic poles after removal of externally applied flux fields. FIGS. 2A and 2B illustrate in schematic form a soft magnetic core 10 having an open magnetic flux path with two poles 16 associated therewith. A movable magnetized hard magnetic member 14 is provided which is movable along an axis proximate and substantially parallel to the axis formed by the poles 16. The soft magnetic core 10, which can be constructed from soft steel becomes magnetized when positioned within proximity of the movable magnetic member 14. The polarity of the magnetization depends on the relative position of the magnetic core 10 and the movable magnetic member 14. If the movable magnetic member 14 and the magnetic core 10 are placed end to end, as illustrated in FIG. 2A, the soft magnetic core is magnetized in such a manner to cause the effective length of the magnet to be increased. On the other hand, if the movable magnetic member 14 and the soft magnetic core 10 are placed side by side, as illustrated in FIG. 2B, the resulting magnetic polarization of the soft magnetic core is opposite to that of the permanent magnet 14. Thus, it can be seen that the polarity of the magetization of the soft magnetic core reverses as the top end of the movable hard magnetic member 14 moves from the bottom end to the top end of the magnetic core 10. If the movable magnet 14 is much longer than the soft magnetic core, as in the case of a reactor drive rod, the flux reversal in the soft magnetic core 10 is achieved with quite small relative displacement of the movable magnetic member 14. Under such circumstances, the term magnetic flip-flop action is appropriate in describing this behavior.

The magnetic flip-flop action is enhanced when soft steel rings 12 are attached to the poles 16 of the soft magnetic core 10 in the manner illustrated in FIGS. 2A and 2B. The movable magnetic member 14 is then moved inside the rings 12. The soft steel rings 12 enhance the sensitivity of the unit by providing a large surface area for the magnetic flux. The rings also minimize the importance of the exact position of the magnet 14 with respect to the sensor 10. The flux is not seriously affected by the lateral movement of the magnet 14 within the rings 12, since any reduction in distance on one side is always accompanied by an equal increase in the distance between the magnet 14 and the ring 12 on the other side.

Having established a base understanding of the magnetic flip-flop action of soft magnetic materials, it only remains necessary to describe the means provided by this invention for converting the polarity change of the steady flux within the magnetic core 10 to an electrical signal change. This can be accomplished by either using magnetically biased reed switches or saturable transformers as part of the magnetic core 10, as illustrated in FIGS. 3, 4 and 5.

Figure 3:
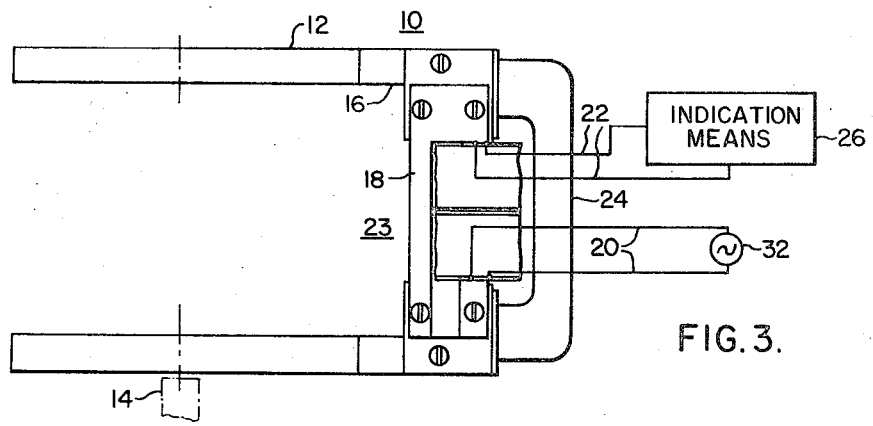
FIG. 3 is a side elevational view illustrating one embodiment of this invention.
Figure 4:
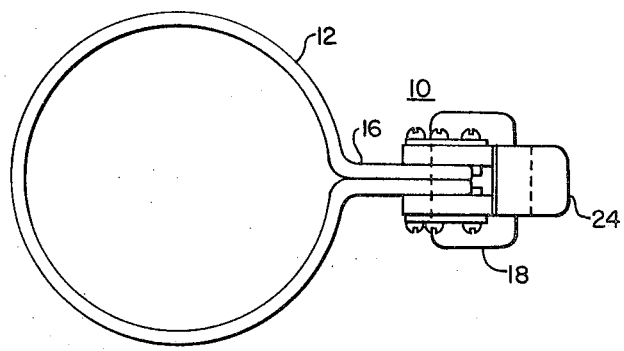
FIG. 4 is a top elevational view of the embodiment illustrated in FIG. 3.

Referring now to FIGS. 3 and 4, it will be observed that such a saturable transformer position indicator is illustrated in schematic form. The core 10, pole pieces 16 and the flux rings 12 are identical with those illustrated in FIG. 2A and FIG. 2B. The distinguishing features of the embodiment illustrated in FIGS. 3 and 4 are the saturable transformer 18 and permanent magnetic biasing means 24 which have been added to the modified bight 23 of the soft magnetic core 10. In accordance with this invention the modified bight 23 of the magnetic core 10 is formed, at least in part, in a generally O-shaped design providing a closed magnetic flux loop of soft magnetic material. The pole pieces 16 form the open legs of a second magnetic flux loop which is normally open circuited and has a magnetic flux path in common with the closed magnetic loop along the bight 23 of the core 10. The permanent magnet 14 completes the flux path within the normally open circuited magnetic loop when positioned across the pole pieces 16. In the embodiments illustrated in FIGS. 3 and 4 the closed looped transformer actually forms the bight 23. The primary and secondary windings, 20 and 22, respectively, are adjacently positioned on the outermost extremity of the transformer core relative to the legs 16 of the sensor 10. The magnetic biasing means 24 is indicated in this embodiment as shunting this outermost extremity. The magnetic biasing means 24 is shown in its simplest form as a permanent magnet which is magnetically coupled across a saturable transformer 18 on the bight 23 of the soft magnetic core 10. In this instance, the bight 23 is actually formed from the transformer laminations. In one mode of operation the polarity of the permanent magnet 24 is chosen so that the resulting magnetic biasing induced at the poles 16 tends to aid the polarity of the long rod magnet 14 in the position indicated in FIG. 2B. For example, if the north pole of the rod magnet is at the top, the biasing of the sensing element has to be such that the top ring is the south pole. The two fluxes going through the saturable transformer due to the magnetic biasing and due to the rod magnet are desirably designed to cancel each other when the magnet 14 is below the sensing element, and thus the transformer laminations are not saturated. On the other hand, if the magnet 14 is passed through both rings 12 of the sensor 10 the two fluxes add, and the transformer laminations 18 become saturated, provided that the cross-sectional area of the transformer laminations 18 and the magnetic biasing 24 is correctly chosen for the particular magnet 14. Other biasing modes of operation will be illustrated hereinafter.

The primary winding 20 of the saturable transformer 18 is supplied with an AC signal 32, 400 hz. in most cases. If in this mode of biasing the rod is below the sensing element, the transformer will not be saturated and the full AC signal will appear across the secondary winding 22. The full secondary signal is present until the top end of the rod magnet 14 reaches the top ring 12 of the element 10; at that point the transformer 18 is saturated, and the secondary voltage across the secondary winding 22 is reduced due to the lack of transformer coupling. Indication means 26 can be placed across the secondary winding to indicate the output voltage. The indication means can be any one of a variety of read-out instruments known in the art, such as a voltmeter or ammeter.

Figure 5:
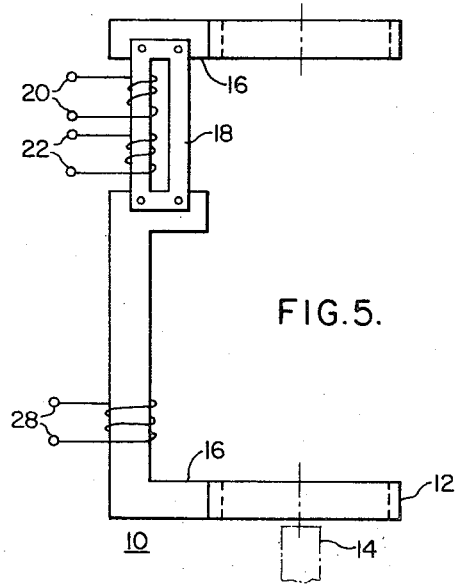
FIG. 5 is a side view of still another embodiment of the invention.

FIG. 5 illustrates a modification of the exemplary embodiment illustrated in FIGS. 3 and 4. Referring to FIG. 5, it will be observed that the saturable transformer 18 only takes up a portion of the bight 23 of the magnetic core 10 and that the permanent magnetic biasing means 24 illustrated in FIGS. 3 and 4 has been replaced by DC biasing coils 28 which are wound around the magnetic core 10. The polarity of the DC current applied to these coils will depend upon the mode of biasing chosen. As an illustration of a second mode of biasing, the polarity of the DC current applied to these coils is chosen so that the resulting magnetic biasing tends to oppose the long rod magnet 14 when positioned across the poles 16 of the soft magnetic sensor core. In all other respects, the construction and operation of the embodiment illustrated in FIG. 5 is identical with the embodiment illustrated in FIGS. 3 and 4. With the biasing thus described the saturable transformer 18 is saturated when the rod 14 is below the magnetic core 10 and is unsaturated when the rod 14 is substantially present between the poles 16. Therefore, the appearance of a voltage across the secondary transformer 22 winding indicates the presence of the movable member 14 substantially between the poles 16 of the soft magnetic core 10.

While the embodiments hereinbefore described have illustrated the sensor of this position indication system as having a magnetic biasing means, such biasing means is optional and is indicative of only several modes of operation of the sensor. The appearance of the hard magnetized movable magnetic member 14 substantially between the poles 16 of the magnetic core 10 can induce enough flux in the magnetic core 10 to saturate the saturable transformer 18. Therefore, the presence of the rod substantially between the poles 16 of the soft magnetic core 10 will saturate the transformer and thereby reduce the output voltage at the secondary winding 22. While the absence of the movable member 14 from the magnetic path between the poles 16, will not induce enough flux to saturate the transformer and the output voltage at the secondary winding 22 will increase.

Figure 6:
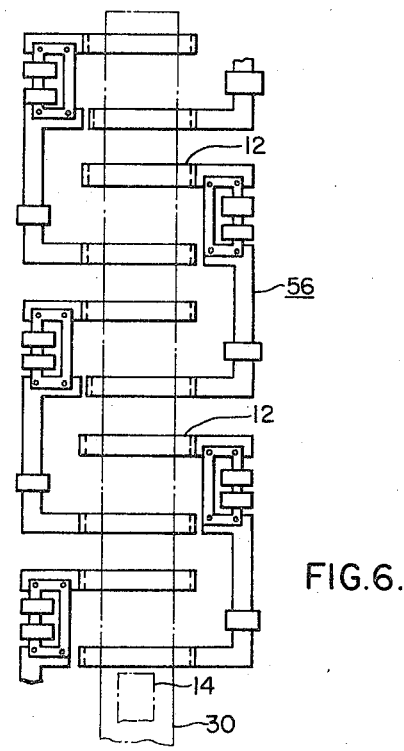
FIG. 6 is a schematic diagram of an array of a plurality of the indicators illustrated in FIG. 5.

A complete rod position indicator array can be constructed from a plurality of sensors interleaved in the manner illustrated in FIG. 6. Referring to FIG. 6 it will be seen that the individual sensor elements are arranged in tandem along the axis of movement of the movable member 14, in this case a control rod. The flux rings 12 are positioned around the control rod housing 30 with adjacent rings of adjacent indicators interleaved. The interleaved structure provides high resolution, while maintaining magnetic isolation between sensing elements. With a strong biasing force opposing the polarity of the magnet 14 when positioned between the pole pieces 16, all the elements of the array are saturated except those below the top end of the rod 14. The latter sensors give a high AC output and therefore indicate the location of the rod. There are basically five modes of operation depending upon the magnetic biasing used: no biasing at all; week biasing with aiding polarization; weak biasing with opposing polarization; strong biasing with aiding polarization; and strong biasing with opposing polarization. Aiding and opposing polarization is used throughout the text to indicate the relative polarity of the pole pieces 16 induced by the biasing means as compared to the polarity of the rod magnet 14 when positioned across the pole pieces 16. Each mode listed above gives a rod position indication. It is largely a matter of convenience which of the five modes is used in any application. Mode 5 is preferred in the case of the rod position indicator array intended for nuclear reactor application, because it requires simpler circuitry in the rest of the system. Therefore, this type of biasing has been illustrated in the preferred embodiment set forth above.

It is necessary that the drive rod be formed from a hard magnetic material. In certain examples, the drive rods of magnetic jack mechanisms are constructed from magnetic stainless steel (Type 410) which retains its magnetism once magnetized. In the mechanism illustrated in the aformentioned Frisch patent there are three large coils, at least one of which carries a DC current at all times. This DC excitation has a direct magnetizing influence on the drive rod, and ensures a powerful rod magnet. If a different drive mechanism is used which does not magnetize the drive rod directly, an exciting coil can be placed over the rod travel housing at the bottom of the rod position indicator array. The drive rod can then be magnetized by supplying the exciting coil with DC current. Alternately the drive rod can be formed from non-magnetic material and include a hard magnetic elongated insert therein.

The indicators of this invention can be arranged in various arrays to meet specific control rod system requirements. They can be positioned in a simple tandem array or interleaved as hereinbefore described. Alternately, they can be positioned at spaced coordinates along the axis of movement of the control rod. Furthermore, there are various methods of securing the sensors of this invention to the control rod housing. The poles 16 of the sensors can be welded directly to the housing or the flux rings 12 can be secured around the circumference of the housing 30 as illustrated in FIG. 5.

The system thus described provides increased accuracy and is less temperature dependent than the system described in the prior art. Redundancy can easily be achieved by utilizing two transformers and exciting coils on each sensor. The interleaved array structure ensures high resolution and is simple, inexpensive and naturally cooled by convection so that the use of high temperature insulating materials are not required.

We claim as our invention:

1. A control rod mechanism for a nuclear reactor comprising:

an elongated tubular housing;

an elongated control drive rod positioned for longitudinal movement within said housing, said drive rod being constructed from a magnetized magnetically hard material forming a flux source;

a plurality of magnetically soft generally C-shaped cores each having a first and second magnetic loop and a magnetic flux path common to at least a portion of said first and second magnetic loops, said first magnetic loop forming a closed magnetic flux path and said second magnetic loop forming a normally open circuited magnetic flux path with two poles associated therewith, said magnetic cores positioned longitudinally along said housing;

an annular ring of magnetically soft material affixed to each of the poles of said magnetic cores respectively, said annular rings closely receiving said housing within the center thereof;

a saturable transformer having a primary and secondary winding forming at least a portion of each of said first magnetic loops;

magnetic biasing means for magnetically biasing each of said magnet cores and providing a sufficient source of flux to saturate said transformer, said biasing means producing a flux field within said magnetic cores, respectively, which is in opposition to the flux field induced by said drive rod at the point in movement thereof where said drive rod appears across the poles of said magnetic cores, said drive rod having a sufficient source of flux to unsaturate said transformer when closing said normally open circuited magnetic core flux path;

AC excitation means for exciting said primary transformer windings; and indication means for indicating a change in current across said transformer secondary windings.

2. A magnetic position indication system comprising:

an elongated movable magnetized hard magnetic member having one degree of freedom along an axis coinciding with the longitudinal dimension of said member;

a plurality of soft magnetic cores each having a first and second magnetic loop and a magnetic flux path common to at least a portion of said first and second magnetic loops, said first magnetic loop forming a closed magnetic flux path and said second magnetic loop forming a normally open circuited magnetic flux path with two poles associated therewith, the poles of said plurality of magnetic cores being arranged in tandem with adjacent poles of said plurality of tandem cores interleaved along the axis of movement of said movable magnetic member and said movable magnetic member having a longitudinal dimension sufficient to substantially close the second magnetic loop of at least one of said soft magnetic cores at at least one point in travel thereof, so that movement of said movable member within proximity of the poles of at least one of said magnetic cores produces a relative change in flux within the corresponding magnetic cores; and means for respectively detecting a change in flux within said magnetic cores.

3. The magnetic position indication system of claim 2 wherein each of said plurality of soft magnetic cores comprise a generally C-shaped core having two open legs respectively forming the two poles of said second magnetic loop and a bight connected therebetween, said bight generally formed at least in part in an O-shape to provide said first closed magnetic loop.

4. The magnetic position indication system of claim 2 wherein said detection means comprises:

a saturable transformer having a primary and a secondary winding, said saturable transformer forming at least a portion of said first magnetic loop;

AC excitation means for exciting said primary transformer winding; and means for indicating a change in current across said transformer secondary winding.

5. The magnetic position indication system of claim 4 wherein said detection means includes magnetic biasing means for magnetically biasing said magnetic core and providing a sufficient source of flux to saturate said transformer, said biasing means producing a flux field within said magnetic core which is in opposition to the flux field produced by said movable member at the point in travel thereof where said movable member closes said normally open circuited magnetic core flux path, said movable member having a sufficient source of flux to substantially unsaturate said transformer when closing said normally open circuited magnetic core flux path.

6. The magnetic position indication system of claim 4 wherein said detection means includes magnetic biasing means for magnetically biasing said magnetic core and providing a sufficient source of flux to saturate said transformer, said biasing means producing a flux field within said magnetic core which is in opposition to the flux field induced by said movable member at the point in travel thereof where said movable member encounters the first of the two poles of said second magnetic loop in its direction of travel to close the open circuit of said second loop, said movable member having a sufficient source of flux to substantially unsaturate said transformer at the point in travel thereof adjacent the first of the two poles of said second magnetic loop.

7. The magnetic position indication system of claim 2 wherein said movable magnetic member comprises a nuclear reactor control rod and said plurality of soft magnetic cores are positioned longitudinally along the axis of movement of the control rod so as to determine the presence or absence of the control rod at the individual core locations.

8. The magnetic position indication system of claim 2 including annular rings of soft magnetic material respectively affixed to the corresponding poles of said soft magnetic cores and oriented along the axis of movement of said movable member to allow said movable member to pass through the annular openings therein.

9. The magnetic position indicator of claim 2 wherein the movable member is constructed having a dimension along its axis of movement sufficient to substantially close the second magnetic loop of substantially all of said magnetic cores at at least one point in travel thereof.

10. A magnetic position indicator comprising:

a magnetic core having an open circuited magnetic flux path with two poles associated with the terminal ends of the open flux path;

a movable magnetically hard magnetized member, movable along an axis proximate and substantially parallel to the axis formed by the poles of said magnetic core and sized to substantially close the open flux path of said core at at least one point in travel thereof;

annular rings of soft magnetic material respectively affixed to the corresponding poles of said magnetic core and oriented along the axis of movement of said movable member to allow said movable member to pass through the annular openings therein; and means for detecting the presence of said movable member substantially adjacent the poles of said magnetic core.

11. The magnetic position indicator of claim 10 wherein the flux path of said core includes a source of flux.

12. A magnetic position indication system comprising:

a plurality of magnetic cores each having an open circuited magnetic flux path with two poles associated with the terminal ends thereof, the poles of said plurality of cores being positioned in an interleaved tandem array along a common axis;

a movable magnetically permeable member having one degree of freedom along an axis parallel and substantially adjacent the common axis of the tandem array of said plurality of magnetic cores, said movable member having a dimension along its axis of movement sufficient to close the open flux path of at least one of said plurality of cores at at least one point in travel thereof; and means for respectively detecting the presence of said movable member substantially adjacent the respective poles of said plurality of magnetic cores.

13. The magnetic position indication system of claim 12 wherein said movable member is constructed having a dimension along its axis of movement sufficient to substantially close the open magnetic flux path of substantially all of said magnetic cores at at least one point in travel thereof.

14. The magnetic position indication system of claim 12 wherein said movable member is constructed from magnetized hard magnetic material.

* * * * *